United States Patent
Liu (10) Patent No.: US 12,177,674 B2
(45) Date of Patent: Dec. 24, 2024

(54) NETWORK CONNECTION METHOD AND DEVICE AND READABLE STORAGE MEDIUM

(71) Applicant: BEIJING XIAOMI MOBILE SOFTWARE CO., LTD., Beijing (CN)

(72) Inventor: Yuan Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 360 days.

(21) Appl. No.: 17/584,927

(22) Filed: Jan. 26, 2022

(65) Prior Publication Data
US 2023/0037475 A1 Feb. 9, 2023

(30) Foreign Application Priority Data
Aug. 6, 2021 (CN) .......................... 202110899569.6

(51) Int. Cl.
*H04W 12/72* (2021.01)
*H04W 8/18* (2009.01)
*H04W 12/06* (2021.01)
*H04W 76/10* (2018.01)

(52) U.S. Cl.
CPC ............ *H04W 12/72* (2021.01); *H04W 8/18* (2013.01); *H04W 12/06* (2013.01); *H04W 76/10* (2018.02)

(58) Field of Classification Search
CPC ..... H04W 12/06; H04W 12/43; H04W 12/72; H04W 76/10; H04W 8/18
See application file for complete search history.

(56) References Cited

U.S. PATENT DOCUMENTS

| | | |
|---|---|---|
| 2007/0004457 A1 | 1/2007 | Han |
| 2015/0237496 A1 | 8/2015 | Gao et al. |
| 2017/0070346 A1 | 3/2017 | Lombardi et al. |
| 2018/0234833 A1 | 8/2018 | Tang et al. |

FOREIGN PATENT DOCUMENTS

| | | | | |
|---|---|---|---|---|
| CN | 108235307 A | * | 6/2018 | |
| EP | 2869661 A1 | * | 5/2015 | ............ H04W 12/04 |

OTHER PUBLICATIONS

Yin (CN 108235307 A), publication date Jun. 29, 2018, English translation (Year: 2018).*
European Patent Application No. 22153444.9, European search opinion, dated Jun. 27, 2022, 9 pages.

* cited by examiner

*Primary Examiner* — Nader Bolourchi
(74) *Attorney, Agent, or Firm* — Cozen O'Connor (57) ABSTRACT

A network connection method, implemented using a first mobile terminal, includes: establishing a first wireless connection to a second mobile terminal; receiving subscriber identity information of a subscriber identity module SIM from the second mobile terminal via the first wireless connection; and establishing a second wireless connection to a network equipment using the subscriber identity information and the first wireless connection, the subscriber identity module SIM is provided in the second mobile terminal for sharing among devices.

18 Claims, 7 Drawing Sheets

FIG. 8

NETWORK CONNECTION METHOD AND DEVICE AND READABLE STORAGE MEDIUM

CROSS-REFERENCE TO RELATED APPLICATIONS

This application claims priority to and benefits of Chinese Patent Application No. 202110899569.6, filed on Aug. 6, 2021, the entire content of which is incorporated herein by reference.

TECHNICAL FIELD

The present disclosure generally relates to the field of wireless communication technology, and more particularly to a network connection method and device as well as a readable storage medium.

BACKGROUND

A subscriber identity module (SIM) card is an IC card held by a mobile subscriber, and an operator's communication system needs to identify the subscriber through the SIM card. The subscriber can communicate by simply inserting or embedding the SIM card into any mobile phone. The SIM card also manages information of many services provided to the subscriber and may be used to store short messages, especially those received when the mobile phone is not turned on or the subscriber is away. Once the SIM card is removed from the communication terminal, the mobile phone will not be able to use services other than emergency.

With the development of SIM technology, new forms of subscriber identity cards have appeared, such as virtual SIM cards, cloud cards, and embedded SIM cards. They all follow protocols like 3rd Generation Partnership Project (3GPP), ISO/IEC 7816 and so on, but the physical form and use form of the card have changed.

The SIM card may be used in one of the following ways: (1) read the SIM card physically connected to an SIM card slot, and use the information in the SIM card for network registration and network communication; and (2) download SIM card information, and use this information for network registration and network communication.

How to use the information of the SIM card more conveniently to complete network connection so as to meet the usage needs of the subscriber in different scenarios is a technical problem that needs to be solved.

SUMMARY

Embodiments of the present disclosure seek to solve at least one of the problems existing in the related art to at least some extent.

In view of this, embodiments of the present disclosure provide a network connection method and device as well as a readable storage medium.

According to a first aspect of embodiments of the present disclosure, there is provided a network connection method, which is implemented using a first mobile terminal. The network connection method includes: establishing a first wireless connection to a second mobile terminal; receiving subscriber identity information of a subscriber identity module SIM from the second mobile terminal via the first wireless connection; and establishing a second wireless connection to a network equipment using the subscriber identity information and the first wireless connection. The subscriber identity module SIM is provided in the second mobile terminal for sharing among devices.

According to a second aspect of embodiments of the present disclosure, there is provided a network connection method, which is implemented using a second mobile terminal. The method includes: establishing a first wireless connection to a first mobile terminal; sending subscriber identity information of a subscriber identity module SIM in the second mobile terminal for sharing among devices to the first mobile terminal via the first wireless connection, to enable the first mobile terminal to establish a second wireless connection to a network equipment using the subscriber identity information and the first wireless connection.

According to a third aspect of embodiments of the present disclosure, there is provided a mobile terminal, including: a first connection module, configured to establish a first wireless connection to a second mobile terminal; a first receiving module, configured to receive subscriber identity information of a subscriber identity module SIM from the second mobile terminal via the first wireless connection; and a second connection module, configured to establish a second wireless connection to a network equipment using the subscriber identity information and the first wireless connection. The subscriber identity module SIM is provided in the second mobile terminal for sharing among devices.

According to a fourth aspect of embodiments of the present disclosure, there is provided a mobile terminal, including: a third connection module, configured to establish a first wireless connection to a first mobile terminal; and a fourth sending module, configured to send subscriber identity information of a subscriber identity module SIM in the mobile terminal for sharing among devices to the first mobile terminal via the first wireless connection, to enable the first mobile terminal to establish a second wireless connection to a network equipment using the subscriber identity information and the first wireless connection.

According to a fifth aspect of embodiments of the present disclosure, there is provided a network connection device, including: a processor; and a memory for storing instructions executable by the processor. The processor is configured to execute the instructions in the memory to implement steps of the method as described in embodiments of the first aspect or steps of the method as described in embodiments of the second aspect.

According to a sixth aspect of embodiments of the present disclosure, there is provided a non-transitory computer-readable storage medium having stored therein executable instructions that, when executed by a processor, causes steps of the method as described in embodiments of the first aspect or steps of the method as described in embodiments of the second aspect to be implemented.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used herein in the description of the present disclosure are only for the purpose of describing specific embodiments, but should not be construed to limit the present disclosure. As used in the description of the present disclosure and the appended claims, "a", "an", "the" and "said" in singular forms mean including plural forms, unless clearly indicated in the context otherwise. It should also be understood that, as used herein, the term "and/or" represents and contains any one and all possible combinations of one or more associated listed items.

According to a first aspect of embodiments of the present disclosure, there is provided a network connection method, which is implemented using a first mobile terminal. The network connection method includes: establishing a first wireless connection to a second mobile terminal; receiving subscriber identity information of a subscriber identity module SIM from the second mobile terminal via the first wireless connection; and establishing a second wireless connection to a network equipment using the subscriber identity information and the first wireless connection. The subscriber identity module SIM is provided in the second mobile terminal for sharing among devices.

In an embodiment, establishing the second wireless connection to the network equipment using the subscriber identity information and the first wireless connection includes: sending a network login request to the network equipment using the subscriber identity information; receiving an authentication request from the network equipment; sending the authentication request to the second mobile terminal via the first wireless connection; receiving an authentication result from the second mobile terminal; sending the authentication result to the network equipment; and establishing the second wireless connection to the network equipment after successful authentication.

In an embodiment, before establishing the first wireless connection to the second mobile terminal, the method further includes running a first program. The first program is configured to: detect whether a first wireless connection is established to another mobile terminal; send a first request to the another mobile terminal via the first wireless connection for acquiring subscriber identity information of a subscriber identity module SIM in the another mobile terminal for sharing among devices, when it is detected that the first wireless connection is established to the another mobile terminal; receive the subscriber identity information; and send a network login request to the network equipment using the subscriber identity information.

In an embodiment, the method further includes: maintaining the first wireless connection to the second mobile terminal during maintenance of the second wireless connection to the network equipment.

According to a second aspect of embodiments of the present disclosure, there is provided a network connection method, which is applied to a second mobile terminal. The method includes: establishing a first wireless connection to a first mobile terminal; sending subscriber identity information of a subscriber identity module SIM in the second mobile terminal for sharing among devices to the first mobile terminal via the first wireless connection, to enable the first mobile terminal to establish a second wireless connection to a network equipment using the subscriber identity information and the first wireless connection.

In an embodiment, the method further includes: determining a default subscriber identity module SIM as the subscriber identity module SIM for sharing among devices; or selecting, in response to a selection instruction, a subscriber identity module SIM from at least two subscriber identity modules SIMs as the subscriber identity module SIM for sharing among devices.

In an embodiment, before establishing the first wireless connection to the first mobile terminal, the method further includes running a second program. The second program is configured to: detect whether a first wireless connection is established to another mobile terminal; receive a first request sent from the another mobile terminal via the first wireless connection if the first wireless connection is established to the another mobile terminal; and send the subscriber identity information of the subscriber identity module SIM for sharing among devices to the another mobile terminal.

In an embodiment, the method further includes: receiving an authentication request from the first mobile terminal via the first wireless connection; computing an authentication result according to the subscriber identity information of the subscriber identity module SIM for sharing among devices; and sending the authentication result to the first mobile terminal.

According to a third aspect of embodiments of the present disclosure, there is provided a mobile terminal, including: a first connection module, configured to establish a first wireless connection to a second mobile terminal; a first receiving module, configured to receive subscriber identity information of a subscriber identity module SIM from the second mobile terminal via the first wireless connection; and a second connection module, configured to establish a second wireless connection to a network equipment using the subscriber identity information and the first wireless connection. The subscriber identity module SIM is provided in the second mobile terminal for sharing among devices.

In an embodiment, the second connection module includes: a first sending module, configured to send a network login request to the network equipment using the subscriber identity information; a second receiving module, configured to receive an authentication request from the network equipment; a second sending module, configured to send the authentication request to the second mobile terminal via the first wireless connection; a third receiving module, configured to receive an authentication result from the second mobile terminal; a third sending module, configured to send the authentication result to the network equipment; and a first establishing module, configured to establish the second wireless connection to the network equipment after successful authentication.

In an embodiment, the mobile terminal further includes a first executing module configured to run a first program. The first program is configured to: detect whether a first wireless connection is established to another mobile terminal; send a first request to the another mobile terminal via the first wireless connection for acquiring subscriber identity information of a subscriber identity module SIM in the another mobile terminal for sharing among devices, when it is detected that the first wireless connection is established to the another mobile terminal; receive the subscriber identity information; and send a network login request to the network equipment using the subscriber identity information.

In an embodiment, the first connection module is further configured to maintain the first wireless connection to the second mobile terminal during maintenance of the second wireless connection to the network equipment.

According to a fourth aspect of embodiments of the present disclosure, there is provided a mobile terminal, including: a third connection module, configured to establish a first wireless connection to a first mobile terminal; and a fourth sending module, configured to send subscriber identity information of a subscriber identity module SIM in the mobile terminal for sharing among devices to the first mobile terminal via the first wireless connection, to enable the first mobile terminal to establish a second wireless connection to a network equipment using the subscriber identity information and the first wireless connection.

In an embodiment, the mobile terminal further includes: a first determining module configured to: determine a default subscriber identity module SIM as the subscriber identity module SIM for sharing among devices; or select, in response to a selection instruction, a subscriber identity module SIM from at least two subscriber identity modules SIMS as the subscriber identity module SIM for sharing among devices.

In an embodiment, the mobile terminal further includes a second executing module, configured to run a second program before the first wireless connection is established to the first mobile terminal. The second program is configured to: detect whether a first wireless connection is established to another mobile terminal; receive a first request sent from the another mobile terminal via the first wireless connection if the first wireless connection is established to the another mobile terminal; and send the subscriber identity information of the subscriber identity module SIM for sharing among devices to the another mobile terminal.

In an embodiment, the mobile terminal further includes: a fourth receiving module, configured to receive an authentication request from the first mobile terminal via the first wireless connection; a first computing module, configured to compute an authentication result according to the subscriber identity information of the subscriber identity module SIM for sharing among devices; and a fifth sending module, configured to send the authentication result to the first mobile terminal.

According to a fifth aspect of embodiments of the present disclosure, there is provided a network connection device, including: a processor; and a memory for storing instructions executable by the processor. The processor is configured to execute the instructions in the memory to implement steps of the method as described in embodiments of the first aspect or steps of the method as described in embodiments of the second aspect.

According to a sixth aspect of embodiments of the present disclosure, there is provided a non-transitory computer-readable storage medium having stored therein executable instructions that, when executed by a processor, causes steps of the method as described in embodiments of the first aspect or steps of the method as described in embodiments of the second aspect to be implemented.

The technical solutions provided by embodiments of the present disclosure may have the following beneficial effects.

The technical solutions provided by embodiments of the present disclosure enable the first mobile terminal to establish a first wireless connection to the second mobile terminal, receive the subscriber identity information of the subscriber identity module SIM in the second mobile terminal, and establish a second wireless connection to the network equipment according to the subscriber identity information, so that the first mobile terminal is able to use the subscriber identity information of the subscriber identity module SIM in the second mobile terminal to establish a communication connection to the network equipment, so that a single subscriber may share the same SIM among several devices, which makes it convenience for the subscriber to use the SIM across devices.

Figure 1:
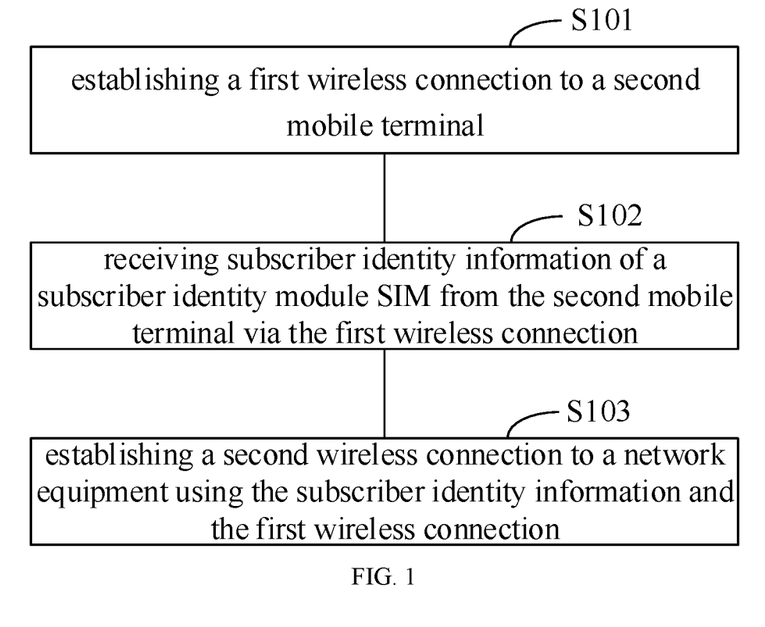
FIG. 1 is a schematic flowchart showing a network connection method implemented using a first mobile terminal according to an embodiment of the present disclosure.

In embodiments of the present disclosure, there is provided a network connection method, which is implemented using a first mobile terminal. FIG. 1 is a schematic flowchart showing a network connection method according to an embodiment of the present disclosure. As illustrated in FIG. 1, the method includes step S101 to step S103.

In step S101, a first wireless connection to a second mobile terminal is established.

In step S102, subscriber identity information of a subscriber identity module SIM is received from the second mobile terminal via the first wireless connection.

In step S103, a second wireless connection to a network equipment is established using the subscriber identity information and the first wireless connection.

The subscriber identity module SIM is provided in the second mobile terminal for sharing among devices.

In a possible embodiment, the first wireless connection is a short-range wireless connection, such as Bluetooth connection, zigbee, near-field communication (NFC) and the like. The second wireless connection is a long-range wireless connection, such as 4G connection or 5G connection.

In a possible embodiment, the second mobile terminal includes at least one subscriber identity module SIM. For example, the second mobile terminal includes two SIMS, three or more SIMS.

In a possible embodiment, the SIM of the second mobile terminal may be in any form supported by the second mobile terminal.

In a possible embodiment, the subscriber identity information of the SIM is an international mobile subscriber identity (IMSI), an integrated circuit card identity (ICCID), etc.

Embodiments of the present disclosure are particularly applicable to the case where the first mobile terminal is not provided with an SIM, while the second mobile terminal is provided with an SIM, no matter whether a SIM card slot in the first mobile terminal is universal with that in the second mobile terminal.

In embodiments of the present disclosure, the first mobile terminal establishes the first wireless connection to the second mobile terminal, receives the subscriber identity information of the subscriber identity module SIM in the second mobile terminal, and establishes the second wireless connection to the network equipment according to the subscriber identity information, so that the first mobile terminal is able to use the subscriber identity information of the subscriber identity module SIM in the second mobile terminal to establish a communication connection to the network equipment, so that a single subscriber may share the same SIM among several devices, which makes it convenience for the subscriber to use the SIM across devices.

Figure 2:
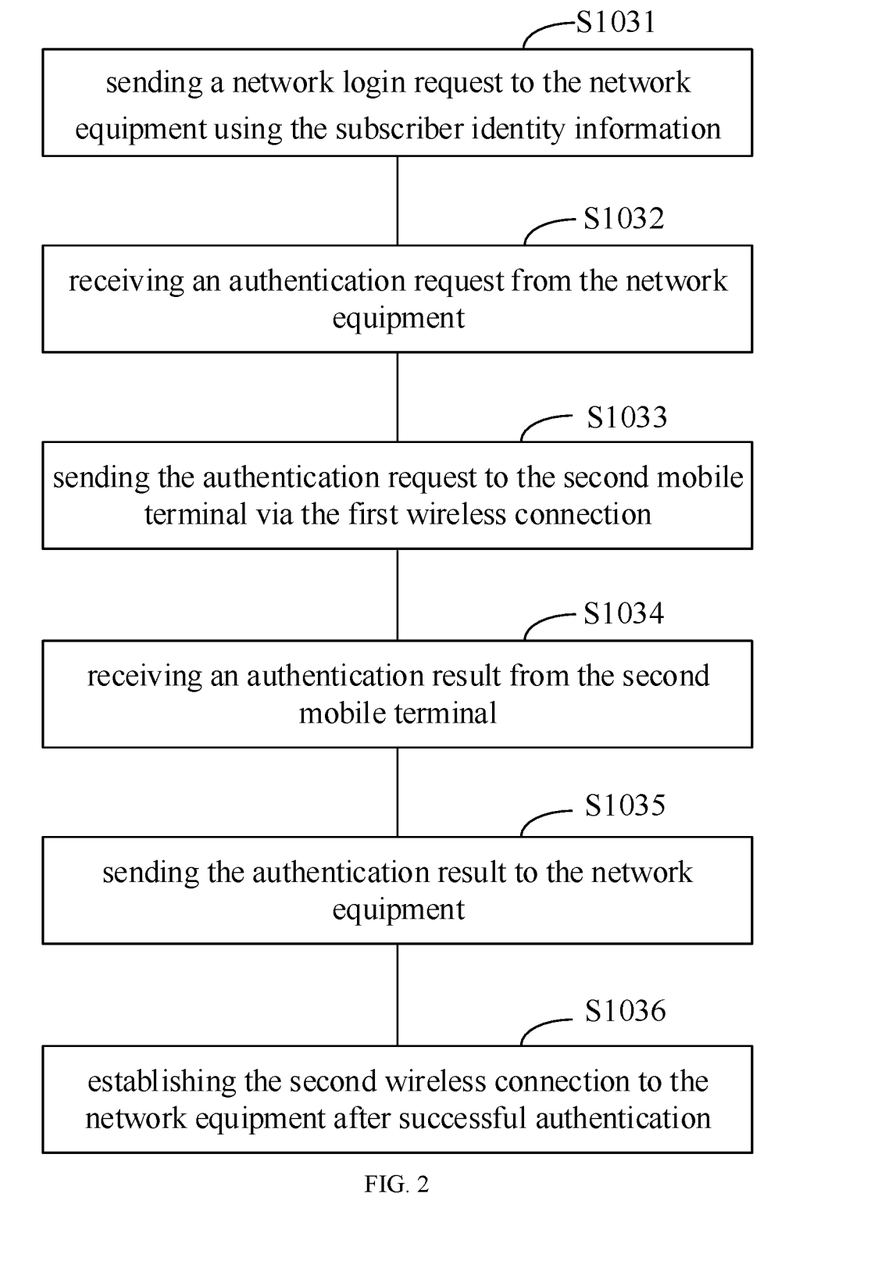
FIG. 2 is a schematic flowchart showing a step S103 of the network connection method as shown in FIG. 1.

In embodiments of the present disclosure, there is provided a network connection method, which is implemented using a first mobile terminal. The method includes steps as illustrated in FIG. 2. Specifically, the step S103 of establishing the second wireless connection to the network equipment using the subscriber identity information and the first wireless connection includes step S1031 to step S1036.

In step S1031, a network login request is sent to the network equipment according to the subscriber identity information.

In step S1032, an authentication request is received from the network equipment.

In step S1033, the authentication request is sent to the second mobile terminal via the first wireless connection.

In step S1034, an authentication result is received from the second mobile terminal.

In step S1035, the authentication result is sent to the network equipment.

In step S1036, the second wireless connection to the network equipment is established after successful authentication.

In the step S1036, the successful authentication means that the network equipment authenticates the authentication result and the authentication succeeds, confirming that the subscriber identity information meets preset conditions.

In embodiments of the present disclosure, the first mobile terminal uses the subscriber identity information of the subscriber identity module SIM in the second mobile terminal to send the network login request to the network equipment, and forwards interaction information with the network equipment to the second mobile terminal via the first wireless connection, so as to take advantage of the management authority of the second mobile terminal on the subscriber identity information to assist the first mobile terminal to complete network registration.

In embodiments of the present disclosure, there is provided a network connection method, which is implemented using a first mobile terminal. The method includes the steps as illustrated in FIG. 1. Besides that, before establishing the first wireless connection to the second mobile terminal, the method further includes running a first program. The first program is configured to: detect whether a first wireless connection is established to another mobile terminal; send a first request to the another mobile terminal via the first wireless connection for acquiring subscriber identity information of a subscriber identity module SIM in the another mobile terminal for sharing among devices, when it is detected that the first wireless connection is established to the another mobile terminal; receive the subscriber identity information; and send a network login request to the network equipment using the subscriber identity information.

In a possible embodiment, a first application is installed on the first mobile terminal. The first application may be called as a card moving application, a card sharing application, etc. The first application corresponds to the first program.

In embodiments of the present disclosure, by starting the first program corresponding to the first application, it is possible to automatically detect in real time whether the first wireless connection has been successfully established between the first mobile terminal and the second mobile terminal. After the first wireless connection is successfully established, the subscriber identity information of the subscriber identity module SIM in the second mobile terminal may be received timely, so as to automatically trigger the network registration and realize automatic sharing.

In embodiments of the present disclosure, there is provided a network connection method, which is implemented using a first mobile terminal. Besides the steps as illustrated in FIG. 1, the method further includes maintaining the first wireless connection to the second mobile terminal during maintenance of the second wireless connection to the network equipment.

In embodiments of the present disclosure, the first mobile terminal maintains the first wireless connection with the second mobile terminal during the second wireless connection with the network equipment, so that when the second connection between the first mobile terminal and the network equipment is disconnected in the subsequent process due to some reasons, the first mobile terminal is able to send information like the authentication request, after received again from the network equipment, to the second mobile terminal in time, so as to complete the reconnection with the network equipment as soon as possible.

Figure 3:
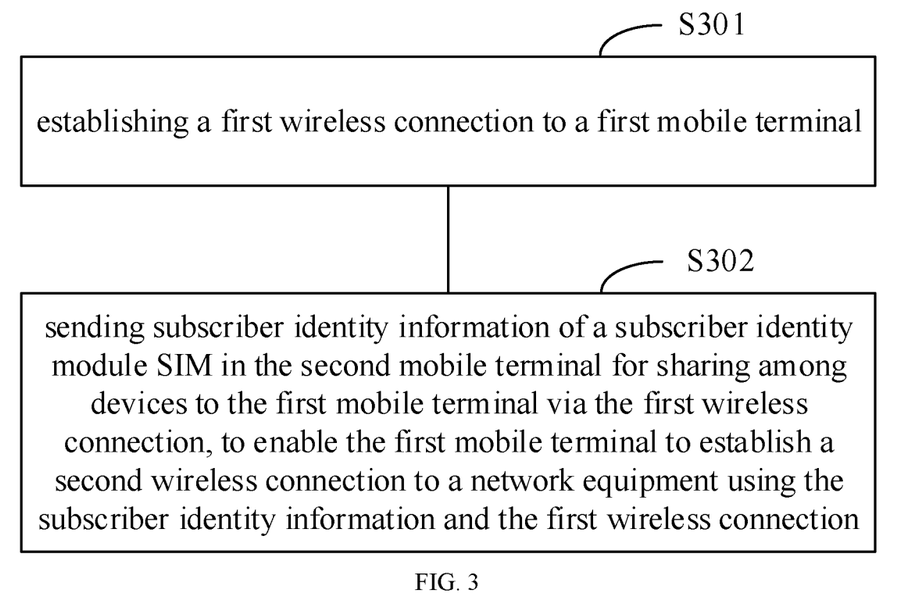
FIG. 3 is a schematic flowchart showing a network connection method implemented using a second mobile terminal according to an embodiment of the present disclosure.

In embodiments of the present disclosure, there is provided a network connection method, which is implemented using a second mobile terminal. FIG. 3 is a schematic flowchart showing a network connection method according to an embodiment of the present disclosure. As illustrated in FIG. 3, the method includes step S301 and step S302 as follows.

In step S301, a first wireless connection to a first mobile terminal is established.

In step S302, subscriber identity information of a subscriber identity module SIM in the second mobile terminal for sharing among devices is sent to the first mobile terminal via the first wireless connection, to enable the first mobile terminal to establish a second wireless connection to a network equipment using the subscriber identity information and the first wireless connection.

Embodiments of the present disclosure are particularly applicable to the case where the first mobile terminal is not provided with an SIM, while the second mobile terminal is provided with an SIM, no matter whether a SIM card slot in the first mobile terminal is universal with that in the second mobile terminal.

In embodiments of the present disclosure, the first mobile terminal establishes the first wireless connection to the second mobile terminal, receives the subscriber identity information of the subscriber identity module SIM in the second mobile terminal, and establishes the second wireless connection to the network equipment according to the subscriber identity information, so that the first mobile terminal is able to use the subscriber identity information of the subscriber identity module SIM in the second mobile terminal to establish a communication connection to the network equipment, so that a single subscriber may share the same SIM among several devices, which makes it convenience for the subscriber to use the SIM across devices.

In embodiments of the present disclosure, there is provided a network connection method, which is implemented using a second mobile terminal. Besides the steps as illustrated in FIG. 3, the method further includes: determining a default subscriber identity module SIM as the subscriber identity module SIM for sharing among devices; or selecting, in response to a selection instruction, a subscriber identity module SIM from at least two subscriber identity modules SIMS as the subscriber identity module SIM for sharing among devices.

In embodiments of the present disclosure, there are two ways for the second terminal to set the subscriber identity module SIM for sharing among devices, one is to set the default subscriber identity module SIM as the subscriber identity module SIM for sharing among devices, the other one is to select, in response to the selection instruction, a subscriber identity module SIM from at least two subscriber identity modules SIMS as the subscriber identity module SIM for sharing among devices. Therefore, the subscriber identity module SIM for sharing among devices may be automatically determined by the second mobile terminal or may be independently selected by the subscriber, so as to meet different needs of the subscriber.

In embodiments of the present disclosure, there is provided a network connection method, which is implemented using a second mobile terminal. Besides the steps as illustrated in FIG. 3, before establishing the first wireless connection to the first mobile terminal, the method further includes running a second program. The second program is configured to: detect whether a first wireless connection is established to another mobile terminal; receive a first request sent from the another mobile terminal via the first wireless connection if the first wireless connection is established to the another mobile terminal; and send the subscriber identity information of the subscriber identity module SIM for sharing among devices to the another mobile terminal.

In a possible embodiment, a second application is installed on the second mobile terminal. The second application may be called as a card moving application, a card sharing application, etc. The second application corresponds to the second program.

In embodiments of the present disclosure, by starting the second program corresponding to the second application, it is possible to automatically detect in real time whether the first wireless connection has been successfully established between the first mobile terminal and the second mobile terminal. After the first wireless connection is successfully established, and after the first request is received from the first mobile terminal, the subscriber identity information of the subscriber identity module SIM for sharing is sent automatically, thereby realizing automatic sharing.

In embodiments of the present disclosure, there is provided a network connection method, which is implemented using a second mobile terminal. Besides the steps as illustrated in FIG. 3, the method further includes: receiving an authentication request from the first mobile terminal via the first wireless connection; computing an authentication result according to the subscriber identity information of the subscriber identity module SIM for sharing among devices; and sending the authentication result to the first mobile terminal.

In embodiments of the present disclosure, the second mobile terminal receives the authentication request from the first mobile terminal via the first wireless connection; computes the authentication result according to the subscriber identity information of the subscriber identity module SIM for sharing among devices; and sends the authentication result to the first mobile terminal, so as enable the first mobile terminal to use the subscriber identity information of the shared subscriber identity module SIM to establish a communication connection with the network equipment.

The present disclosure will be illustrated in detail below with reference to a specific example.

Example

Device A is not provided with an SIM, and device B is provided with two SIMS, one of which is for sharing. A subscriber cannot access internet directly through device A because device A is not provided with an SIM, in this case, the subscriber may share the SIM of device B with device A, so as to access the internet on device A.

Figure 4:
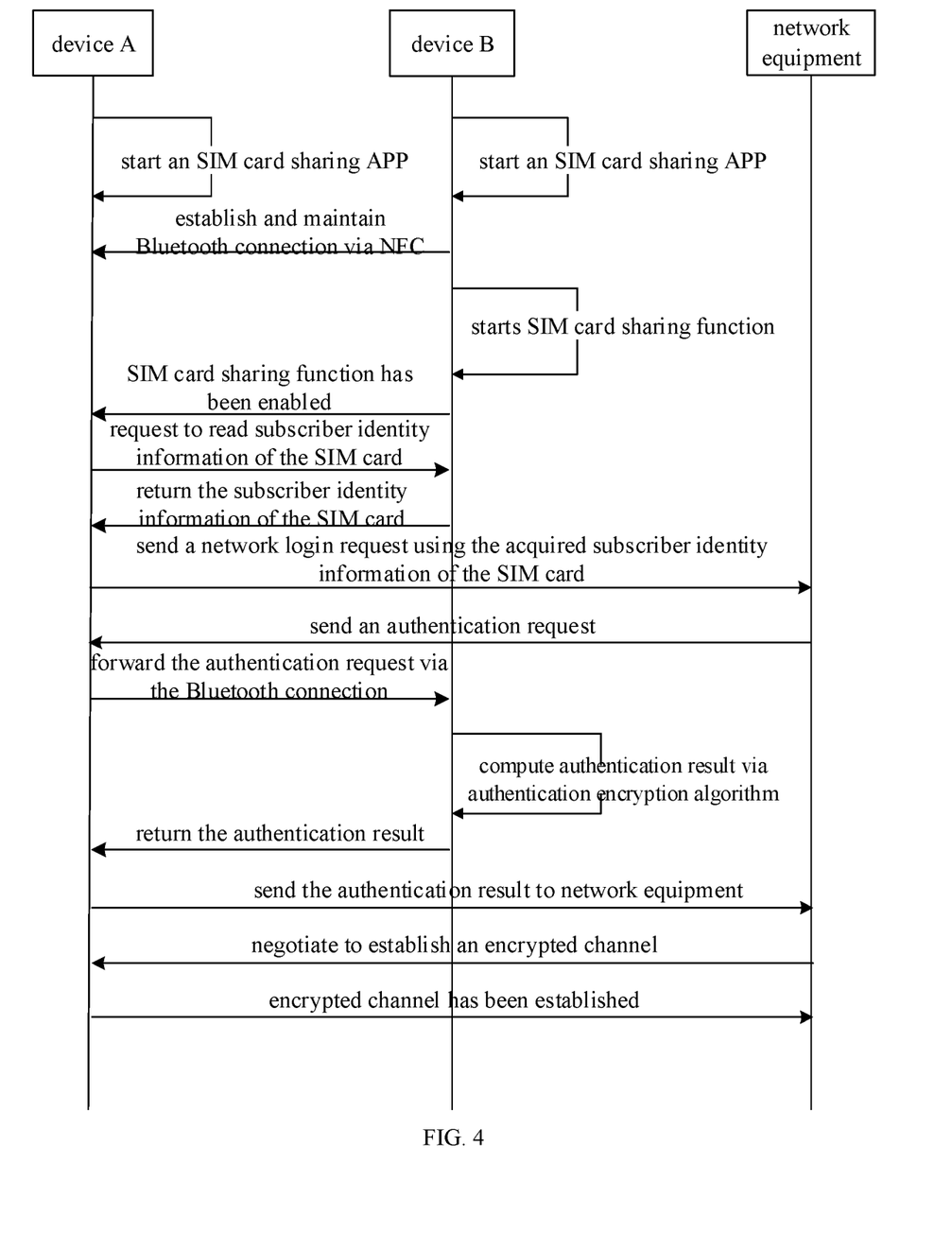
FIG. 4 is a schematic flowchart showing a network connection method according to an embodiment of the present disclosure.

As illustrated in FIG. 4, a network connection method includes step S401 to step S413 as follows.

In step S401, device A starts an SIM card sharing APP installed thereon, and device B stars an SIM card sharing APP installed thereon.

In step S402, device B establishes and maintains a Bluetooth connection with device A.

In step S403, device B automatically starts an SIM card sharing function after establishing the Bluetooth connection with device A.

In step S404, device B notifies device A that the SIM card sharing function is enabled.

In step S405, device A sends a request to device B to read subscriber identity information of the SIM card.

In step S406, device B returns the subscriber identity information of the SIM card to device A.

In step S407, device A sends a network login request using the acquired subscriber identity information of the SIM card.

In step S408, a network equipment sends an authentication request to device A.

In step S409, device A forwards the authentication request to device B through the Bluetooth connection with device B.

In step S410, device B calculates an authentication result through an authentication encryption algorithm and returns the authentication result to device A.

In step S411, device A sends the authentication result to the mobile network equipment.

In step S412: after successful authentication, the mobile network equipment negotiates with device A to establish an encrypted channel.

In step S413, device A returns the information that the encrypted channel has been established to the mobile network equipment.

Regarding the authentication, the network equipment stores a subscriber authentication key ki corresponding to the subscriber identity information of the SIM in advance. The SIM also stores the subscriber authentication key ki. After the step S407, the network equipment generates an unpredictable pseudo-random number RAND through a pseudo-random code generator, and generates an authentication result according to the subscriber authentication key ki and the pseudo-random number RAND using a preset authentication algorithm. The network equipment sends the authentication request carrying the pseudo-random number RAND to device A, as described in step S408, device A forwards the authentication request to device B, and device B generates an authentication result using a preset authentication algorithm according to the subscriber authentication key ki stored in the SIM of device B and the received pseudo-random number RAND. After the step S411, the network equipment determines whether the authentication result generated by the network equipment is the same as the received authentication result, if yes, it is considered that the authentication is successful, and if no, it is considered that the authentication is failed.

Figure 5:
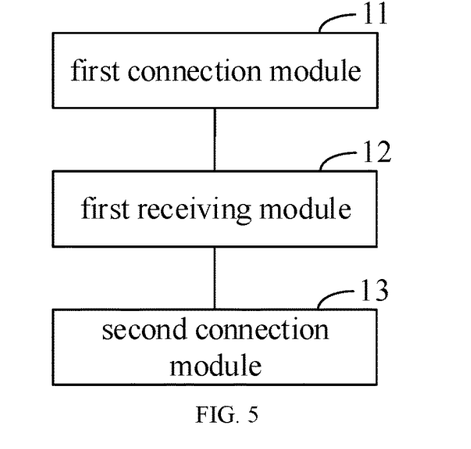
FIG. 5 is a schematic block diagram of a mobile terminal according to an embodiment of the present disclosure.

In embodiments of the present disclosure, there is provided a mobile terminal. FIG. 5 is a schematic block diagram of a mobile terminal according to an embodiment of the present disclosure. As illustrated in FIG. 5, the mobile terminal includes a first connection module 11, a first receiving module 12 and a second connection module 13.

The first connection module 11 is configured to establish a first wireless connection to a second mobile terminal.

The first receiving module 12 is configured to receive subscriber identity information of a subscriber identity module SIM from the second mobile terminal via the first wireless connection.

The second connection module 13 is configured to establish a second wireless connection to a network equipment using the subscriber identity information and the first wireless connection.

The subscriber identity module SIM is provided in the second mobile terminal for sharing among devices.

Figure 6:
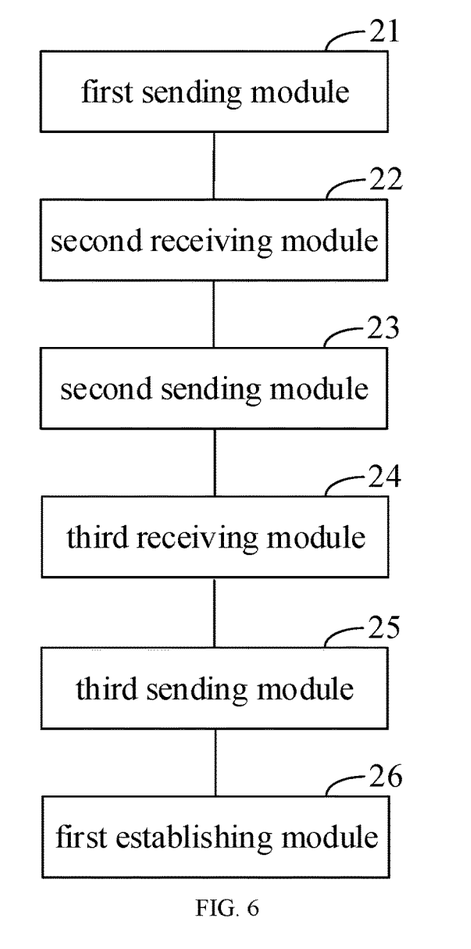
FIG. 6 is a schematic block diagram of a second connection module 13 of the mobile terminal as shown in FIG. 5.

In embodiments of the present disclosure, there is provided a mobile terminal. The mobile terminal includes the modules as illustrated in FIG. 5. Further, as illustrated in FIG. 6, the second connection module 13 includes a first sending module 21, a second receiving module 22, a second sending module 23, a third receiving module 24, a third sending module 25 and a first establishing module 26.

The first sending module 21 is configured to send a network login request to the network equipment using the subscriber identity information.

The second receiving module 22 is configured to receive an authentication request from the network equipment.

The second sending module 23 is configured to send the authentication request to the second mobile terminal via the first wireless connection.

The third receiving module 24 is configured to receive an authentication result from the second mobile terminal.

The third sending module 25 is configured to send the authentication result to the network equipment.

The first establishing module 26 is configured to establish the second wireless connection to the network equipment after successful authentication.

In embodiments of the present disclosure, there is provided a mobile terminal. The mobile terminal includes the modules as illustrated in FIG. 5. Besides that, the mobile terminal further includes a first executing module 14.

The first executing module 14 is configured to run a first program. The first program is configured to: detect whether a first wireless connection is established to another mobile terminal; send a first request to the another mobile terminal via the first wireless connection for acquiring subscriber identity information of a subscriber identity module SIM in the another mobile terminal for sharing among devices, when it is detected that the first wireless connection is established to the another mobile terminal; receive the subscriber identity information; and send a network login request to the network equipment using the subscriber identity information.

In embodiments of the present disclosure, there is provided a mobile terminal. The mobile terminal includes the modules as illustrated in FIG. 5. Further, the first connection module 11 is further configured to maintain the first wireless connection to the second mobile terminal during maintenance of the second wireless connection to the network equipment.

Figure 7:
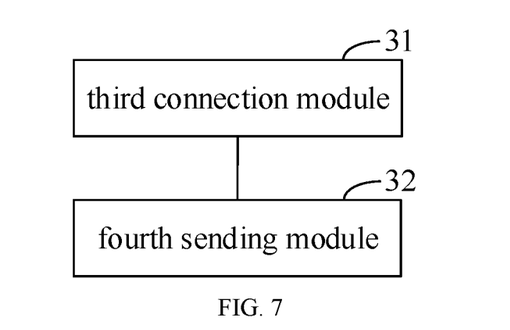
FIG. 7 is a schematic diagram of a network connection device according to an embodiment of the present disclosure.

In embodiments of the present disclosure, there is provided a mobile terminal. FIG. 7 is a schematic block diagram of a mobile terminal according to an embodiment of the present disclosure. As illustrated in FIG. 7, the mobile terminal includes a third connection module 31 and a fourth sending module 32.

The third connection module 31 is configured to establish a first wireless connection to a first mobile terminal.

The fourth sending module 32 is configured to configured to send subscriber identity information of a subscriber identity module SIM in the mobile terminal for sharing among devices to the first mobile terminal via the first wireless connection, to enable the first mobile terminal to establish a second wireless connection to a network equipment using the subscriber identity information and the first wireless connection.

In embodiments of the present disclosure, there is provided a mobile terminal. The mobile terminal includes the modules as illustrated in FIG. 7. Besides that, the mobile terminal further includes a first determining module 33.

The first determining module 33 is configured to: determine a default subscriber identity module SIM as the subscriber identity module SIM for sharing among devices; or select, in response to a selection instruction, a subscriber identity module SIM from at least two subscriber identity modules SIMs as the subscriber identity module SIM for sharing among devices.

In embodiments of the present disclosure, there is provided a mobile terminal. The mobile terminal includes the modules as illustrated in FIG. 7. Besides that, the mobile terminal further includes a second executing module 34.

The second executing module 34 is configured to run a second program before the first wireless connection is established to the first mobile terminal. The second program is configured to: detect whether a first wireless connection is established to another mobile terminal; receive a first request sent from the another mobile terminal via the first wireless connection if the first wireless connection is established to the another mobile terminal; and send the subscriber identity information of the subscriber identity module SIM for sharing among devices to the another mobile terminal.

In embodiments of the present disclosure, there is provided a mobile terminal. The mobile terminal includes the modules as illustrated in FIG. 7. Besides that, the mobile terminal further includes a fourth receiving module 35, a first computing module 36, and a fifth sending module 37.

The fourth receiving module 35 is configured to receive an authentication request from the first mobile terminal via the first wireless connection.

The first computing module 36 is configured to compute an authentication result according to the subscriber identity information of the subscriber identity module SIM for sharing among devices.

The fifth sending module 37 is configured to send the authentication result to the first mobile terminal.

In embodiments of the present disclosure, there is provided a network connection device, which is implemented using a mobile terminal. The network connection device includes a processor; and a memory for storing instructions executable by the processor. The processor is configured to execute the instructions in the memory to implement steps of the network connection method as described hereinbefore.

In embodiments of the present disclosure, there is provided a non-transitory computer-readable storage medium having stored therein executable instructions that, when executed by a processor, causes steps of the network connection method as described hereinbefore to be implemented.

Figure 8:
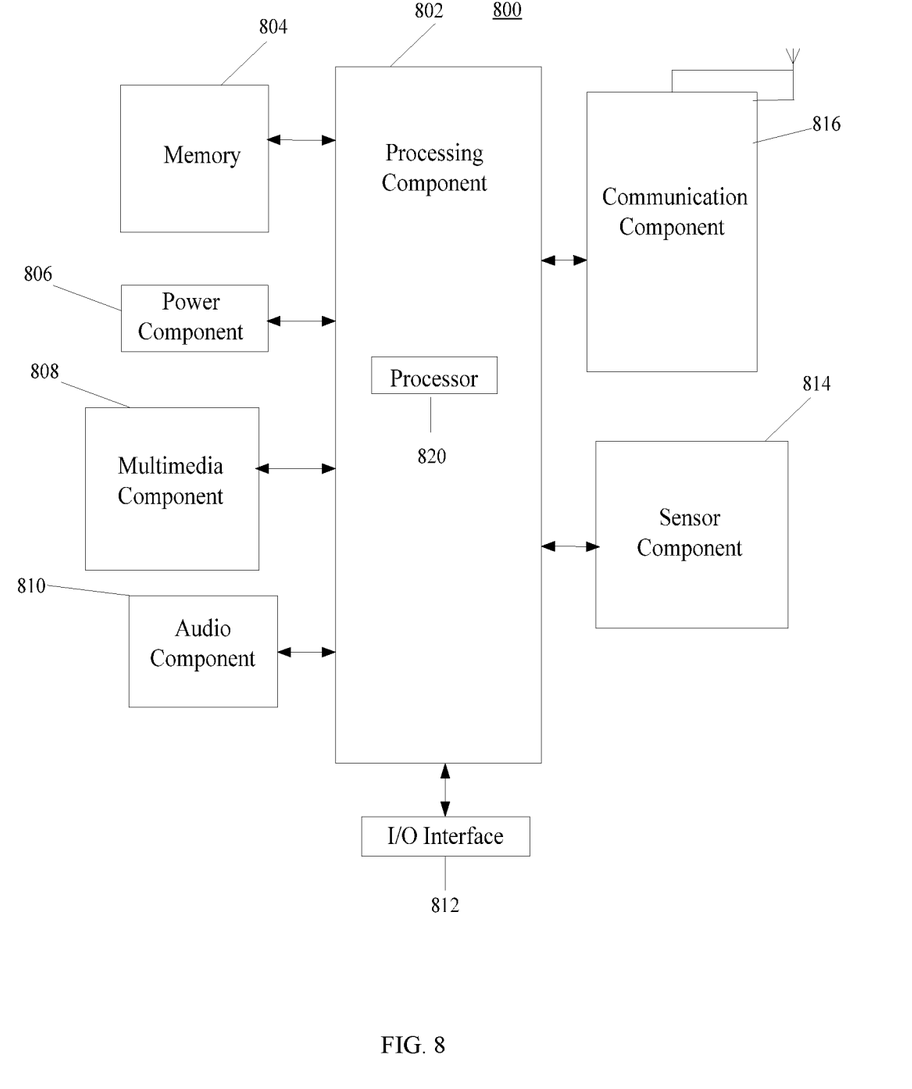
FIG. 8 is a schematic diagram of a network connection device according to an embodiment of the present disclosure.

FIG. 8 is a block diagram of a network connection device 800 according to an exemplary embodiment. For example, the device 800 may be a mobile phone, a computer, a digital broadcast terminal, a messaging device, a gaming console, a tablet, a medical device, exercise equipment, a personal digital assistant, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G or 3G 4G 5G or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 804 including instructions executable by the processor 820 in the device 800, for performing the above-described methods. For example, the non-transitory computer-readable storage medium may be a ROM, a random access memory (RAM), a CD-ROM, a magnetic tape, a floppy disc, an optical data storage device, and the like.

In addition, terms such as "first", "second", 'third" and "fourth" are used herein for purposes of description and are not intended to indicate or imply relative importance or significance or to imply the number of indicated technical features. Thus, the feature defined with "first", "second", 'third" and "fourth" may comprise one or more of this feature. In the description of the present invention, "a plurality of" means two or more than two, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various combinations, substitutions, modifications and changes can be made without departing from the scope thereof, which are deemed to be included in the scope of the present disclosure. It is intended that the scope of the present disclosure only be limited by the appended claims.

What is claimed is:

1. A network connection method, implemented using a first mobile terminal, comprising:
    establishing a first wireless connection to a second mobile terminal;
    receiving subscriber identity information of a subscriber identity module SIM from the second mobile terminal via the first wireless connection; and
    establishing a second wireless connection to a network equipment using the subscriber identity information and the first wireless connection,
    wherein the subscriber identity module SIM is provided in the second mobile terminal for sharing among devices,
    wherein establishing the second wireless connection to the network equipment using the subscriber identity information and the first wireless connection comprises:
    sending a network login request to the network equipment using the subscriber identity information
    receiving an authentication request from the network equipment;
    sending the authentication request to the second mobile terminal via the first wireless connection;
    receiving an authentication result from the second mobile terminal;
    sending the authentication result to the network equipment; and
    establishing the second wireless connection to the network equipment after successful authentication.

2. The method according to claim 1, wherein before establishing the first wireless connection to the second mobile terminal, the method further comprises running an application to:
    detect whether a first wireless connection is established to another mobile terminal;
    send a first request to the another mobile terminal via the first wireless connection for acquiring subscriber identity information of a subscriber identity module SIM in the another mobile terminal for sharing among devices, when it is detected that the first wireless connection is established to the another mobile terminal;
    receive the subscriber identity information; and
    send a network login request to the network equipment using the subscriber identity information.

3. The method according to claim 1, further comprising:
    maintaining the first wireless connection to the second mobile terminal during maintenance of the second wireless connection to the network equipment.

4. A network connection device, implemented using a first mobile terminal, comprising:
    a processor; and
    a memory for storing instructions executable by the processor,
    wherein the processor is configured to execute the instructions in the memory to implement steps of the method according to claim 1.

5. The network connection device according to claim 4, wherein the processor is configured to execute the instructions in the memory to run an application to:
    detect whether a first wireless connection is established to another mobile terminal;
    send a first request to the another mobile terminal via the first wireless connection for acquiring subscriber identity information of a subscriber identity module SIM in the another mobile terminal for sharing among devices, when it is detected that the first wireless connection is established to the another mobile terminal;
    receive the subscriber identity information; and
    send a network login request to the network equipment using the subscriber identity information.

6. The network connection device according to claim 4, wherein the processor is configured to execute the instructions in the memory to maintain the first wireless connection to the second mobile terminal during maintenance of the second wireless connection to the network equipment.

7. A non-transitory computer-readable storage medium having stored therein executable instructions that, when executed by a processor, causes steps of the method according to claim 1 to be implemented.

8. A non-transitory computer-readable storage medium having stored therein executable instructions that, when executed by a processor, causes steps of the method according to claim 2 to be implemented.

9. A non-transitory computer-readable storage medium having stored therein executable instructions that, when executed by a processor, causes steps of the method according to claim 3 to be implemented.

10. A network connection method, implemented using a second mobile terminal, comprising:

establishing a first wireless connection to a first mobile terminal; and sending subscriber identity information of a subscriber identity module SIM in the second mobile terminal for sharing among devices to the first mobile terminal via the first wireless connection, to enable the first mobile terminal to establish a second wireless connection to a network equipment using the subscriber identity information and the first wireless connection, wherein before establishing the first wireless connection to the first mobile terminal, the method further comprises running an application to:

automatically detect whether the first wireless connection is established to the first mobile terminal;

receive a first request sent from the first mobile terminal via the first wireless connection if the first wireless connection is established to the first mobile terminal; and automatically send the subscriber identity information of the subscriber identity module SIM for sharing among devices to the first mobile terminal.

11. The method according to claim 10, further comprising:

determining a default subscriber identity module SIM as the subscriber identity module SIM for sharing among devices; or selecting, in response to a selection instruction, a subscriber identity module SIM from at least two subscriber identity modules SIMs as the subscriber identity module SIM for sharing among devices.

12. The method according to claim 10, further comprising:

receiving an authentication request from the first mobile terminal via the first wireless connection;

computing an authentication result according to the subscriber identity information of the subscriber identity module SIM for sharing among devices; and sending the authentication result to the first mobile terminal.

13. A network connection device, implemented using a second mobile terminal, comprising:

a processor; and a memory for storing instructions executable by the processor, wherein the processor is configured to execute the instructions in the memory to implement steps of the method according to claim 10.

14. The network connection device according to claim 13, wherein the processor is configured to execute the instructions in the memory to:

determine a default subscriber identity module SIM as the subscriber identity module SIM for sharing among devices; or select, in response to a selection instruction, a subscriber identity module SIM from at least two subscriber identity modules SIMs as the subscriber identity module SIM for sharing among devices.

15. The network connection device according to claim 13, wherein the processor is configured to execute the instructions in the memory to:

receive an authentication request from the first mobile terminal via the first wireless connection;

compute an authentication result according to the subscriber identity information of the subscriber identity module SIM for sharing among devices; and send the authentication result to the first mobile terminal.

16. A non-transitory computer-readable storage medium having stored therein executable instructions that, when executed by a processor, causes steps of the method according to claim 10 to be implemented.

17. The non-transitory computer-readable storage medium according to claim 16, wherein the executable instructions, when executed by a processor, causes the following steps to be implemented, including:

receiving an authentication request from the first mobile terminal via the first wireless connection;

computing an authentication result according to the subscriber identity information of the subscriber identity module SIM for sharing among devices; and sending the authentication result to the first mobile terminal.

18. A non-transitory computer-readable storage medium having stored therein executable instructions that, when executed by a processor, causes steps of the method according to claim 11 to be implemented.

* * * * *